S. E. NORMAN.
RAKE.
APPLICATION FILED SEPT. 29, 1909.
1,014,250. Patented Jan. 9, 1912.
2 SHEETS—SHEET 1.
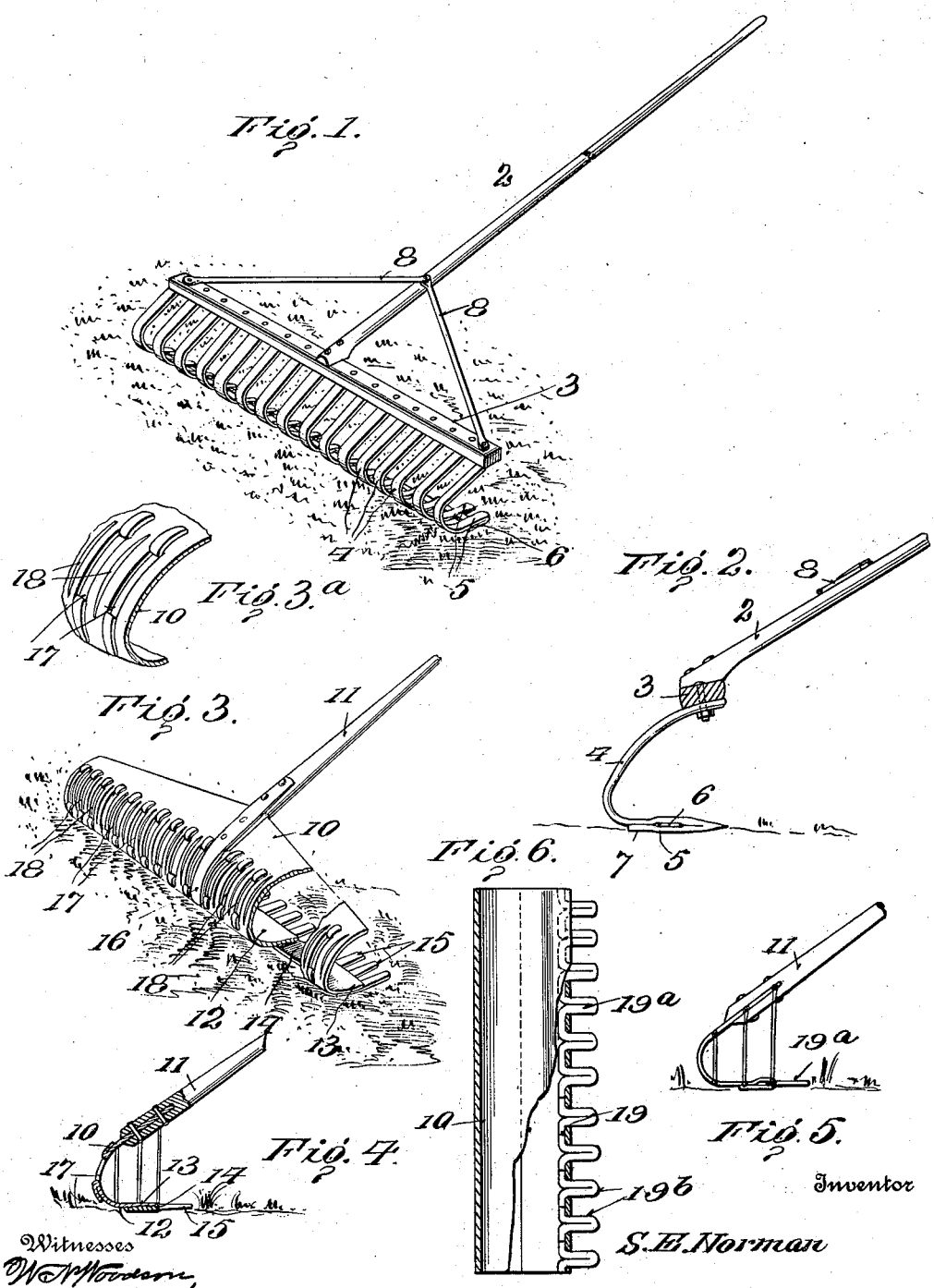

S. E. NORMAN.
RAKE.
APPLICATION FILED SEPT. 29, 1909.
1,014,250.
Patented Jan. 9, 1912.
2 SHEETS—SHEET 2.
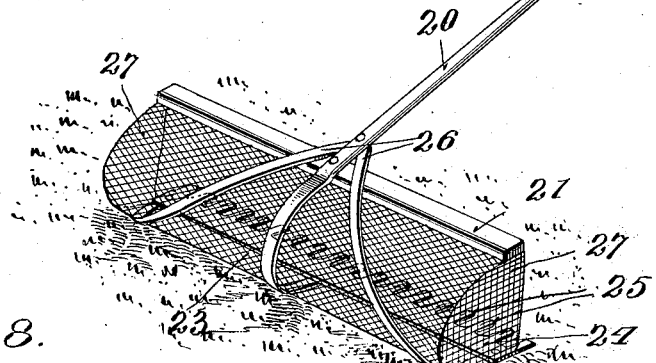
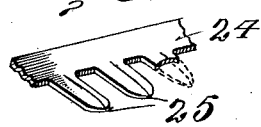
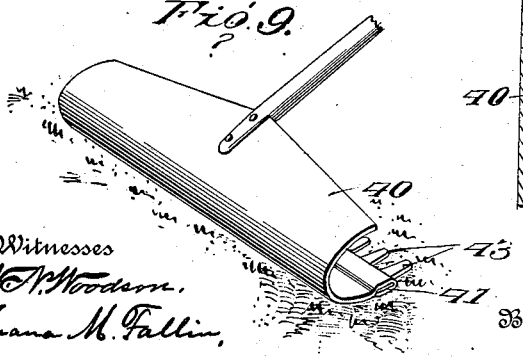
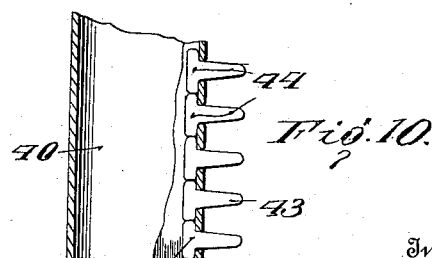

UNITED STATES PATENT OFFICE.

STERLING E. NORMAN, OF ATTLEBORO, MASSACHUSETTS.

RAKE.

1,014,250.  Specification of Letters Patent.  Patented Jan. 9, 1912.

Application filed September 29, 1909. Serial No. 520,144.

*To all whom it may concern:*

Be it known that I, STERLING E. NORMAN, citizen of the United States, residing at Attleboro, in the county of Bristol and State of Massachusetts, have invented certain new and useful Improvements in Rakes, of which the following is a specification.

My invention relates to garden rakes, and the object thereof is to provide a hand rake which will not foul, but is so formed that the teeth move under the material being raked, and may be cleared by a simple rearward movement of the rake.

Another object is to combine with the rake as above described, a shield located rearward of the points of the teeth, said shield preferably forming a pocket into which the material raked up is gathered and retained during the advance movement of the rake, this pocket being of very light material and preferably formed so that air currents will not be created upon a backward movement of the rake, which would tend to scatter the leaves and trash over a surface already raked.

Broadly, my invention consists in providing a hand rake wherein the teeth have such an angular relation to the handle that instead of projecting downward toward the ground when the rake is being used, they will extend along parallel with or upon the ground or surface being raked, and rest thereon, approximately their whole length, a scraper bar or blade being provided, extending transversely across the teeth and located rearward of the points thereof, this scraping bar, by its position relative to the teeth, being adapted to scrape beneath the leaves, trash, etc., being raked, and so lift the material onto the scraping plate and onto the body of the rake. This scraping bar, plate, or blade, not only performs this function, but it prevents leaves and trash from being forced down to the base of the rake teeth and becoming so fouled therewith as to make the teeth difficult to clean.

For a full understanding of the invention and the merits thereof, and to acquire a knowledge of the details of construction, reference is to be had to the following description and accompanying drawings, in which:

Figure 1 is a perspective view of one form of my device; Fig. 2 is a side view thereof; Fig. 3 is a perspective view of another form of the invention, the body being partly broken away; Fig. 3ª is a perspective detail view showing the manner of reinforcing the shield plate in Fig. 3; Fig. 4 is a side elevation of Fig. 3; Fig. 5 is a side view of a form of my device, similar to that in Fig. 3, but provided with detachable teeth; Fig. 6 is a sectional plan view, enlarged, showing the manner of fastening the detachable rake teeth in place; Fig. 7 is a perspective view of another form of rake; Fig. 8 is a detail perspective view of the toothed bar and teeth thereon; Fig. 9 is a perspective view of another form of the invention; and, Fig. 10 is a sectional plan view of a portion of Fig. 11, showing the manner in which the detachable teeth are held in place.

Corresponding and like parts are referred to in the following description and indicated in all the views of the drawings by the same reference characters.

Referring now to Fig. 1, 2 designates a rake handle, and 3 the cross bar or head attached thereto. To the cross bar are attached a plurality of flattened wires or strips 4 which extend rearward from the cross bar or in a direction away from the handle, then downward, and then forward at a relatively sharp angle, as at 5, the angle of the teeth 5 being in such relation to the handle that when the handle is in its ordinary raking position the straight portion 5 of the rake teeth will lie flat upon the ground, as shown in Fig. 4. A cross bar 6 is attached to the rake teeth, rearward of the points thereof, this cross bar or blade having a relatively sharp forward edge, extending transversely between the teeth and at right angles thereto, so that it will slip beneath leaves, trash, or other material being raked, and lift the same onto the cross bar and the teeth. This cross bar may be attached to the teeth in any convenient manner, but I have shown the ends of the teeth as returned, as at 7, and the cross bar as held between the teeth and said returned portion, the cross bar being riveted or otherwise attached to the teeth. This cross bar not only slips beneath the material being raked, but it prevents the teeth from becoming fouled, by preventing leaves and trash from being pushed backward on the rake and the base thereof. As the rake teeth only project a short distance from the edge of the cross bar or blade 6, a comparatively small amount of trash will clog the teeth, and this may be easily removed by a rearward movement of the rake. The handle 3 is provided with the diagonally extending braces 8 attached to the cross bar at their outer ends.

Another form of my invention is shown in Fig. 3, wherein the body of the rake is formed by a plate 10 of metal, wood, or other like and suitable material, constituting a shield which is attached at its middle to the handle 11, this plate being bent downward, outward and inward, as at 12, and being provided along its edge with a plurality of rake teeth, these teeth being spaced from each other so that the margin of the shield 10 extends between the teeth rearward of the apices thereof and at right angles thereto. The lower margin of the shield 10 is flat so as to lie approximately flat upon the ground or the surface being raked, when the handle is in its usual position. While the teeth might be formed by cutting the margin of the portion 13, yet preferably I reinforce this margin by attaching thereto a transverse plate or blade 14 having teeth 15 cut therefrom. This plate or bar 14 and the edge of the shield are equivalent to the cross bar 6 in operation. In other words, they slip beneath the leaves and trash and lift the same onto the body of the rake. The teeth will lie flat upon the surface being raked and, being relatively thin, will easily slip beneath the leaves. The material lifted by the rake will therefore be collected in the rear portion of the shield which forms a pocket to this end. A reinforcing strip or brace 16 is attached to the rake handle and extends down and around the body portion of shield 10, the extremity of the strip 16 being inserted between the bar 14 and the edge of the shield, and being held in place therein by a rivet. Preferably, the shield 10 is formed with a plurality of slots 17, and the metal between the slots is ribbed or corrugated, as at 18, so as to additionally strengthen the shield. In order to further strengthen the shield, the slots 17 may be formed by slitting the metal and then bending the sides of the slit back onto the body of the plate, as shown in the detail view, Fig. 3ª.

In Fig. 6 I show another means of forming the rake teeth upon the margin of the shield 10. The margin of the plate is formed with a plurality of holes 19. A strip of wire 19ª is then bent, as shown in Fig. 6, to form a plurality of loops, each loop constituting a rake tooth. These teeth formed by the folded wire are inserted through the perforations 19, and the margin of the plate is then bent over upon itself, thus holding the teeth securely in position. As shown at 19ᵇ in Fig. 6, the wire teeth need not be made of one continuous strip of wire, but the wire may be folded as previously described and then cut up into sections 19ᵇ, each section thereby forming a complete tooth. It will be seen that the construction shown in Fig. 6 provides not only for a cheap and simple manner of making rake teeth, but also provides a reinforce for the margin of the shield. It is to be noted that in this construction also the teeth are spaced from each other and that there is provided a relatively thin blade extending between the teeth rearward of the apices thereof and at right angles thereto.

In Fig. 7 I show another form of my invention, in which the body of the rake is formed of wire netting or other like material, so that when the rake is operated, no air currents can be created which will tend to scatter leaves and trash over the ground already raked. In this figure, 20 designates the rake handle and 21 a cross piece thereon. 23 indicates a body of wire network curved downward, outward and inward in the same manner as the body 10 previously described. The margin of the wire netting is attached to a plate 24 having thereon a series of rake teeth 25 of the construction previously described. Braces 26 extend from the handle to the extremities of the body portion 21 so as to brace the same, these braces being preferably curved to conform with the curvature of the body. The ends of the pocket formed by the body portion are closed by transverse wires 27. The strip 24 from which the projecting teeth are cut reinforces the edge of the wire netting, and being connected to the center and end braces 26, prevents any deformation of the wire netting forming the body. The teeth in this form of my invention are cut from the plate 24, and each tooth is slightly curved laterally so as to strengthen it. These teeth are spaced from each other and the edge of the web between the teeth extends at right angles to the teeth. While I have described the body of the rake as being formed of wire netting, it is to be understood that it might also be formed of any other light and perforated or reticulated material.

In Figs. 9 and 10 I show another manner of attaching the rake teeth to a shield plate such as that shown in Fig. 3. In this form of my invention, the margin of the shield 40 is rearwardly bent, as at 41, forming a fold in which the rake teeth may be retained. The margin of the plate is perforated and the rake teeth project through these perforations. The teeth designated by the numeral 43 may be either of metal, wood, or other material, and each is provided at its end with a head 44. These teeth as in the other forms of my invention are spaced from each other and the margin of the plate extends between the teeth and at right angles thereto so as to provide a lifting edge, as previously described.

The advantages of my invention as embodied in the several forms shown, reside in the fact that the rake teeth lie flat upon the surface being raked, and therefore easily slip beneath the leaves, trash or other material. Instead of the material passing between the rake teeth, as in the ordinary rakes, thus compelling the ground to be raked a number of times, the trash, leaves, etc., pass onto the upper surface of the rake teeth, and transverse blade or plate and are retained thereon. The rake teeth being flat and projecting as described, and being spaced from each other and having a relatively flat thin lifting portion extending between the teeth and at right angles thereto do not pierce the leaves being raked, and thus no fouling of the rake can occur. The rake does not have to be lifted upon a rearward movement and then lowered, but as it moves rearward, it slides over the leaves or other material being raked up. At the same time, a rearward movement of the rake will tend to clear the rake teeth of any trash that may gather thereon. It will be seen that the rake is so constructed as to prevent the material engaged by the rake from passing out behind the teeth, and thus, when the rake has once been drawn over a surface, the surface will be practically clean of trash, for none will be scattered by the rake in its passage.

Having thus described the invention, what I claim is:—

1. A rake having a handle, a shield attached to the handle and extending downward therefrom approximately parallel thereto, and being then bent toward the free end of the handle at a slight angle therewith so that the bottom of the shield may rest upon the surface being raked, rake teeth extending beyond the edge of the shield and lying in the same plane as the flat bottom of the shield, said rake teeth being straight for their entire length and spaced from each other, the forward edge of the shield extending transversely between the teeth inward of the margin thereof, and at right angles to the direction of the teeth.

2. A rake having a handle, a shield attached to the handle and extending downward therefrom approximately parallel thereto, and being then bent toward the free end of the handle at a slight angle therewith to form a flat portion adapted to rest upon the surface being raked, and a tooth bar separate from and attached to the flat margin of the shield and having spaced teeth extending in the same plane as the flat portion of the shield.

3. A rake having a handle, a shield attached to the handle, the upper portion of the shield being approximately parallel to the handle, the lower portion of the shield being bent and extending toward the free end of the handle, the upper portion of the shield overhanging the lower portion, the lower edge of the shield being returned upon itself to form a fold, and a tooth bar of a length equal to the width of the lower edge of the shield and formed with teeth extending out from the body of the tooth bar, said tooth bar being attached to the lower edge of the shield so that its teeth shall project out in the same plane as the shield, and thereby rest their whole length on the ground.

4. A rake having a handle, a shield attached to the handle, the upper portion of the shield being parallel to the handle, the lower portion of the shield being bent and extending toward the free end of the handle, the upper portion of the shield overhanging the lower portion, the lower edge of the shield being formed with a return bend, the fold formed thereby being provided with a plurality of perforations, and a tooth bar folded upon itself at equidistant points to form a plurality of outwardly projecting teeth, said tooth bar being carried within the return bend of the lower edge of the shield, the teeth projecting out through the perforations in the fold thereof.

In testimony whereof I affix my signature in presence of two witnesses.

STERLING E. NORMAN. [L. S.]

Witnesses:
   FREDERIC B. WRIGHT,
   W. N. WOODSON.

---

Copies of this patent may be obtained for five cents each, by addressing the "Commissioner of Patents, Washington, D. C."